F. KIRSTEN.
HAIRPIN.
APPLICATION FILED NOV. 8, 1920.
1,413,408.
Patented Apr. 18, 1922.
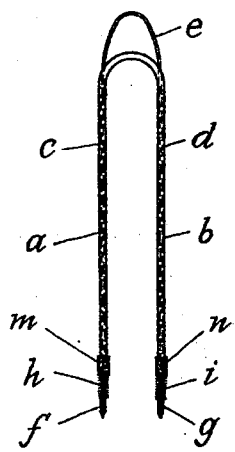
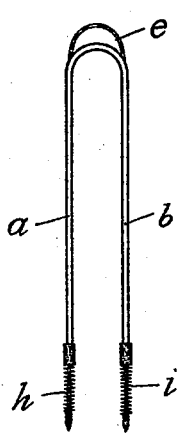
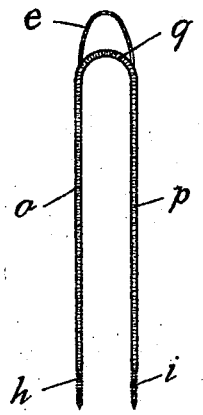
Inventor:
Friedrich Kirsten

UNITED STATES PATENT OFFICE.

FRIEDRICH KIRSTEN, OF CELLE, GERMANY.

HAIRPIN.

1,413,408. Specification of Letters Patent. Patented Apr. 18, 1922.

Application filed November 8, 1920. Serial No. 422,736.

*To all whom it may concern:*

Be it known that I, FRIEDRICH KIRSTEN, a citizen of the German Republic, residing at Celle, Germany, have invented certain new and useful Improvements in Hairpins, (for which I have filed application in Germany Oct. 9, 1919,) of which the following is a specification.

My invention relates to hairpins and its particular object is to provide a hairpin adapted, when inserted in the hair, to take a fast hold thereon and thus to be secured against dropping out.

To attain this end I provide the free ends of the hairpin with fine resilient spiral wires or coil springs which after having been inserted in the hair can be extended, the single windings of the coil being spread apart whereby some hairs will engage between these windings and will be held fast between them on the windings being closed up again. The spreading apart of the coils is effected by means of wires displaceable disposed within the said coils and having their ends fixed to the free ends of said coil springs, while their shanks extend through the shanks of the hairpin proper which are for this purpose made hollow. Preferably the inner ends of the coil springs are fixed to the ends of the tubular pin-shanks.

In the drawings affixed to this specification and forming part thereof two modifications of a hairpin embodying my invention are illustrated by way of example. In the drawings Figs. 1 and 2 are elevations of one modification in closed and open condition, respectively.

Fig. 3 shows the other modifications.

Referring to Figs. 1 and 2 of the drawings, $a$ and $b$ are the tubular shanks of the hairpin and $c$, $d$ are the shanks of a bent wire inserted in said tubular shanks, the parts $c$, $d$ being connected by the curved piece $e$. The free ends $f$, $g$ of the inner wire $c$, $d$ are fixed to the outer ends of short coil springs $h$, $i$ loosely surrounding the ends of the pin-shanks $a$, $b$ and fixed to these shanks, some of the windings $m$, $n$ being connected with each other and with the pin-shanks $a$, $b$ by soldering or by other suitable means.

On pressure being exerted on the curved piece $e$ in the direction towards the coil springs, these latter will be caused to expand, their windings being spread apart so that some hairs may engage therebetween, whereupon, as the pressure is discontinued, the coils will close upon each other and will grip the hairs tightly between them.

As shown in Fig. 3, the tubular shanks $a$, $b$ may be dispensed with entirely, the hairpin proper being formed in this case of a long coil spring $o$, $p$ bent in U-shape, all the windings of the said spring with the only exception of some of the end windings $h$, $i$ being converted into coherent tubular members by means of a metallic coating, such as solder, interconnecting the windings.

I claim:

1. A hairpin comprising in combination, a coil spring fixed to the end of each shank of said pin and a U-shaped wire extending along said shanks and having its ends fixed to the free ends of said coil springs.

2. A hairpin comprising in combination, a pair of tubular shanks, a U-shaped wire extending through said shanks and coil springs having one end fixed to said pin-shanks and the other end to an end of said wire.

3. A hairpin comprising in combination, a U-shaped coiled wire having its windings, excepting the end windings, connected by solder, and a U-shaped plain wire inserted in and having its ends fixed to the ends of said coiled wire.

In testimony whereof I affix my signature.

FRIEDRICH KIRSTEN.